US008611075B2

(12) United States Patent  (10) Patent No.: US 8,611,075 B2
Carter  (45) Date of Patent: Dec. 17, 2013

(54) APPARATUS FOR MOUNTING AN AUDIO PLAYER

(76) Inventor: Zane Carter, Worton, MD (US)

(*) Notice: Subject to any disclaimer, the term of this patent is extended or adjusted under 35 U.S.C. 154(b) by 0 days.

(21) Appl. No.: 13/412,710

(22) Filed: Mar. 6, 2012

(65) Prior Publication Data

US 2013/0201609 A1 Aug. 8, 2013

Related U.S. Application Data

(60) Provisional application No. 61/595,442, filed on Feb. 6, 2012.

(51) Int. Cl.
| H05K 5/00 | (2006.01) |
| H05K 7/00 | (2006.01) |
| G06F 1/16 | (2006.01) |
| A42B 1/24 | (2006.01) |
| H04R 1/02 | (2006.01) |
| H04R 9/06 | (2006.01) |
| H04R 25/00 | (2006.01) |

(52) U.S. Cl.
USPC ............ 361/679.01; 361/679.41; 361/679.43; 361/679.56; 2/209.13; 381/333; 381/374; 381/376

(58) Field of Classification Search
USPC .......................... 361/679.01, 679.03, 679.56, 361/679.41–679.44; 206/701, 703, 722, 206/724, 308.3; 2/209.13; 381/333, 374, 381/376, 388; 455/344, 354
See application file for complete search history.

(56) References Cited

U.S. PATENT DOCUMENTS

| 5,881,160 | A | 3/1999 | Sheppard |
| 7,166,987 | B2* | 1/2007 | Lee et al. ............. 320/114 |
| 7,702,122 | B2 | 4/2010 | Crutcher |
| 7,778,023 | B1* | 8/2010 | Mohoney ............ 361/679.41 |
| 7,974,432 | B1 | 7/2011 | Ryan |
| 7,986,034 | B2* | 7/2011 | Kemper et al. ........... 257/690 |
| 8,009,847 | B2 | 8/2011 | Planansky |
| 8,019,110 | B1 | 9/2011 | Johnson |
| 8,116,077 | B1* | 2/2012 | Strauser ............ 361/679.41 |
| 8,180,410 | B2* | 5/2012 | Kim ................. 455/575.1 |
| 2005/0058317 | A1 | 3/2005 | Montgomery |
| 2006/0050903 | A1* | 3/2006 | Chan ................. 381/124 |
| 2007/0226876 | A1 | 10/2007 | Foust |
| 2009/0009957 | A1* | 1/2009 | Crooijmans et al. ...... 361/686 |
| 2009/0214070 | A1 | 8/2009 | Kwon |
| 2009/0303588 | A1 | 12/2009 | Charlesworth |
| 2010/0118485 | A1* | 5/2010 | Crooijmans et al. ..... 361/679.43 |
| 2010/0149748 | A1* | 6/2010 | Lam ............... 361/679.41 |
| 2010/0277862 | A1* | 11/2010 | Kim ............... 361/679.41 |
| 2010/0324705 | A1* | 12/2010 | Vandiver ............. 700/94 |
| 2011/0170703 | A1* | 7/2011 | Palma ............... 381/74 |
| 2011/0219522 | A1 | 9/2011 | Petitt |
| 2011/0286620 | A1 | 11/2011 | Flynn |
| 2012/0176087 | A1* | 7/2012 | Lee et al. .............. 320/114 |

* cited by examiner

*Primary Examiner* — Anthony Haughton
(74) *Attorney, Agent, or Firm* — Emerging Strategies

(57) ABSTRACT

Disclosed is a mounting dock with an integral jack for digital audio players, preferably that incorporate a built-in clip, including, but not limited to the iPod Shuffle® and iPod Nano® manufactured by Apple, Inc. The dock includes a tapered and beveled mounting stem that inserts into the audio player's clip and a jack that inserts into and provides electrical connection with the audio player's audio port. The stem and jack are positioned and aligned so as to enable simultaneous mounting and electrical connection with the audio player, thereby effecting connection with a desired output device, such as earphones, with one hand in a single motion.

17 Claims, 6 Drawing Sheets

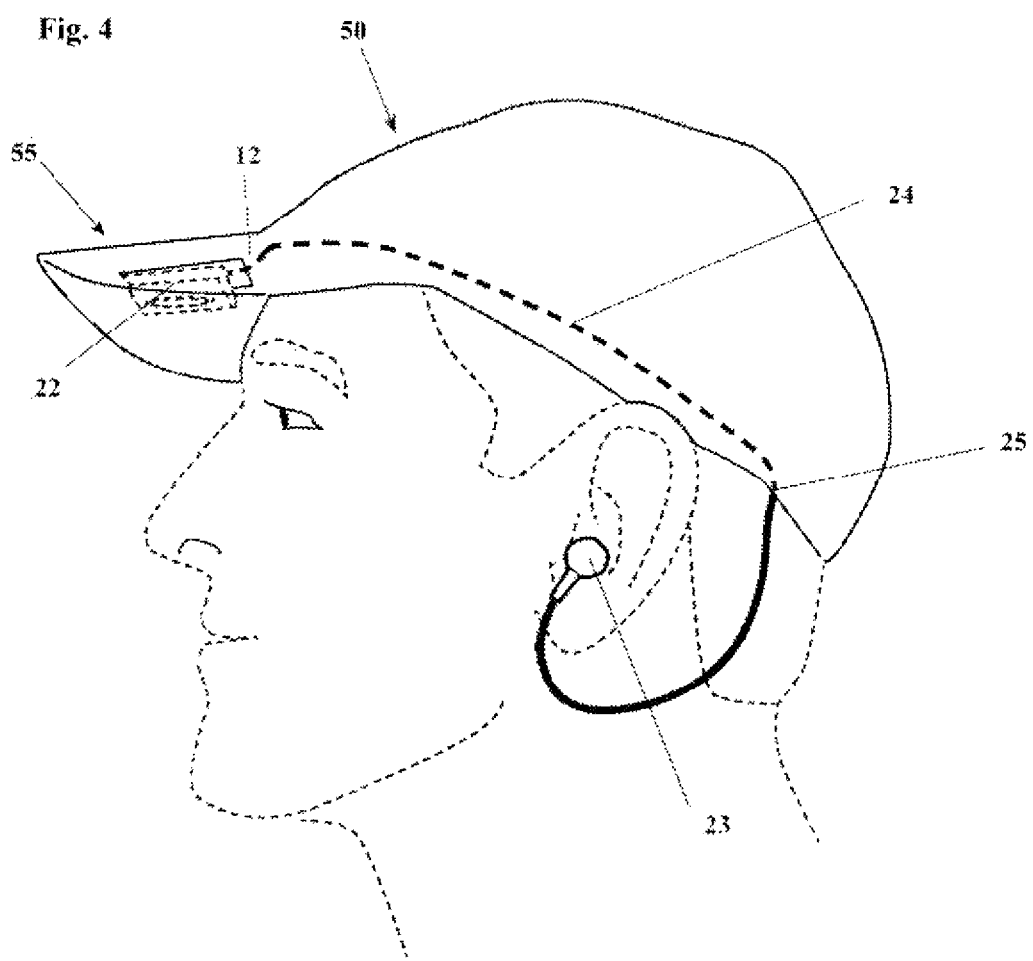

APPARATUS FOR MOUNTING AN AUDIO PLAYER

REFERENCE TO EARLIER APPLICATION

This Application incorporates by reference and claims priority to U.S. Provisional Patent Application Ser. No. 61/595,442 filed on Feb. 6, 2012.

BACKGROUND OF THE INVENTION

Ever since compact digital audio players came on the market, such as, but not limited to the iPod Shuffle® and iPod Nano® manufactured by Apple, Inc., users have devised carriers to hold and position the audio players so that neither the audio player nor the earphone cord would interfere with the user's physical activities, while keeping the audio player itself readily accessible. Some solutions have included pouches, arm and wrist bands, caps with pockets that house both audio player and earphone cord, and cumbersome units that sit on top of the user's cap.

These and other carriers require two hands to mount the audio player thereto and then to plug the mini jack cable into the audio player. This awkward mounting technique of the audio player to the carrier and cumbersome operation of the audio player thereafter has hampered commercially viability of the audio players.

Commercially viability of the audio players also has been adversely affected by the peculiar appearances of the carriers, which range from conspicuous to unsightly. Some carriers render the audio player inaccessible by enveloping the carrier in a pocket or case. Some carriers position the audio player so that it is exposed to the elements or otherwise at risk of damage.

Further, although a variety of carriers have been designed for use in automobiles, such are configured to access audio players sufficiently sized to provide USB jacks. No affixable, unidirectional mounting docks have been created that incorporate the mini jack audio cable required to connect certain audio players to a standard auxiliary port on a car radio or portable sound system, "boom box", etc.

SUMMARY OF THE INVENTION

The present invention overcomes the foregoing concerns and enables a user to mount an audio player securely with one hand in a single motion on a base that is susceptible to installation on any surface, and provides ready, one-handed access to the controls of the audio player.

To that end, an embodiment configured according to principles of the invention includes a base; a stem extending from the base and configured to engage with the audio player; and a data port on the base configured to enable data communication with the audio player.

Another embodiment configured according to principles of the invention includes a base; and a coupler configured to be engaged by the audio player and maintain the audio player relative to the base.

The invention provides improved elements and arrangements thereof, for the purposes described, which are inexpensive, dependable and effective in accomplishing intended purposes of the invention.

Other features and advantages of the invention will become apparent from the following description of the preferred embodiments, which refers to the accompanying drawings.

BRIEF DESCRIPTION OF THE DRAWINGS

The invention is described in detail below with reference to the following figures, throughout which similar reference characters denote corresponding features consistently, wherein:

FIG. 4 is an environmental perspective view of the embodiment of FIGS. 1A and 1B operatively connected to an audio output device and mounted on a hat;

DETAILED DESCRIPTION OF THE PREFERRED EMBODIMENTS

The invention is a mounting dock with an integral or attached jack for digital audio players, preferably that incorporate a built-in clip, including, but not limited to the iPod Shuffle® and iPod Nano® manufactured by Apple, Inc. The dock includes a tapered and beveled mounting stem that inserts into the audio player's clip and a jack configured for insertion into and providing electrical connection with the audio player's audio port.

The stem and jack are positioned and aligned so as to enable simultaneous mounting and electrical connection with the audio player, thereby effecting connection with a desired output device, such as earphones, with one hand in a single motion.

The mounting dock may be adapted for a variety of applications by changing the output cable to match the desired output or usage, including, but not limited to earphones, earbuds, mini jacks (male or female), digital-to-cassette audio adapters and the like.

The mounting dock may be affixed permanently to or formed integral with an object, such as a baseball cap, or affixed impermanently with "peel-and-stick" adhesives.

Figure 1A:
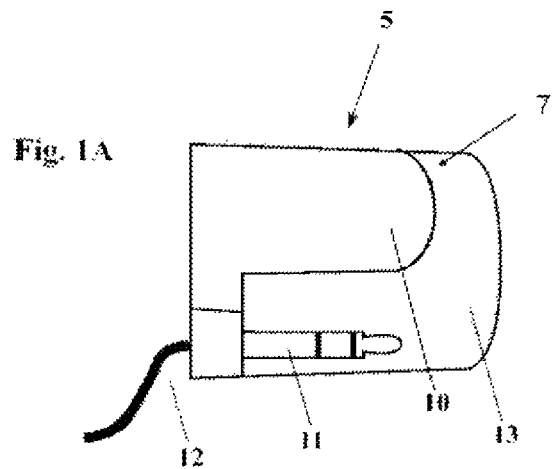
FIG. 1A is a plan view of an embodiment configured according to principles of the invention.
Figure 1B:
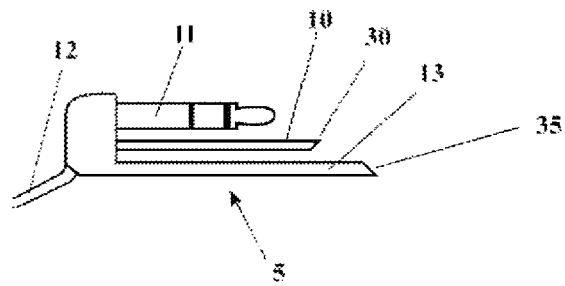
FIG. 1B is a right side elevation of the embodiment of FIG. 1A.

Referring to FIGS. 1A and 1B, an embodiment of an apparatus for mounting an audio player 5 includes a base 13. A stem 10 extends from base 13. As shown in FIG. 1B, base 13 preferably has a beveled edge 35 and stem 10 preferably has a beveled edge 30. As shown in FIG. 1A, stem 10 preferably also has a tapered and/or rounded profile 7 at a distal end thereof.

An electrical connector or jack 11 extends from base 13. Jack 11 is configured comparably to a conventional data communications jack that is appropriate for transmitting electronic signals for communications. Jack 11 preferably is configured to effect an annular snap fit or interference fit with a receiving port (not shown) such as is common to many audio players (not shown). Alternatively, jack 11 may assume other conventional electrical communications connector configurations, including but not limited to USB.

"Snap fit" may be understood, but is not limited to mating or engaging male and female parts whereby the smaller-diameter male part has a bump or ridge feature around its circumference. The ridge diameter is slightly larger than the inside diameter of the mating tube-shaped female part. Typically, the male part is constructed from a more rigid material than the female part, thereby permitting the ridge to deflect the female part outwardly. Deflection imposes a relatively high singular or repeated, short-term hoop stress distributed along the axis of the female part as the male part slides therein. The ridge feature engages an undercut grove molded into the inside diameter of the female part, wherein the assembly returns to a stress-free condition.

An output 12 preferably is integral with and, as shown, extends from base 13. Output 12 provides for data or electrical communication between an audio player (not shown) mounted on and engaged with apparatus 5 and an audio output device (not shown), as described above. Output 12 may assume any form, male, female or other suitable connection component, that is appropriate for connecting base 13 with any audio output device (not shown). Wireless communication between base 13 and audio player and/or audio output device (not shown) is within the scope of the invention.

Figure 3A:
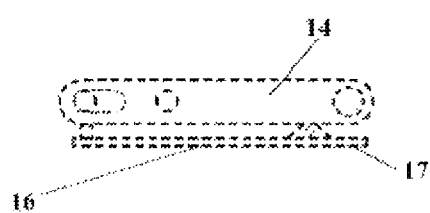
FIGS. 3A-3C are rear elevational views of the audio player of FIGS. 2A and 2B.
Figure 3B:
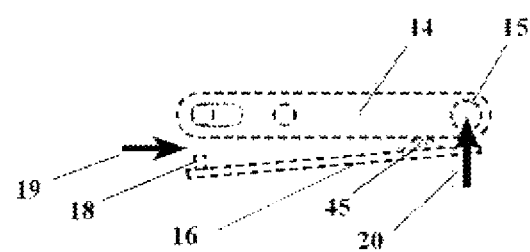

Referring to FIGS. 3A and 3B, an audio player 14 envisioned with, but not limited to the invention typically has a spring-loaded clip 16. A narrow area 17 is intended for manually actuating or opening clip 16, as shown in FIG. 3B, for receiving a relatively narrow object, such as a hat bill or edge of clothing (not shown). When area 17 is released, a spring (not shown) of clip 16 urges a ridge 18 toward audio player 14, thereby squeezing an object received therebetween.

Ridge 18 runs parallel to and spaced from hinge 45 of clip 16. Ridge 18 is understood to be intended to grip the edge of a pocket or seam (not shown). Conventionally, clip 16 is attached by inserting the edge of the seam in a sideways direction 19 into the opening defined by ridge 18 and audio player 14. Notably, direction 19 is perpendicular to the orientation of port 15, hence the direction 20 in which a jack is inserted into port 15. Consequently, mounting audio player 14 on an object and connecting a jack with audio player 14 typically occurs along perpendicular directions, therefore typically requires two hands.

Figure 2A:
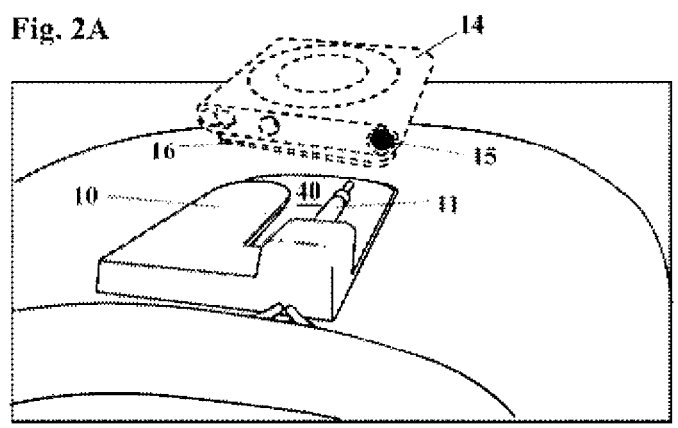
FIGS. 2A and 2B are top, right, rear environmental perspective views of the embodiment of FIGS. 1A and 1B receiving an audio player, shown in phantom lines and defining no part of the invention.

Referring also to FIG. 2A, the invention overcomes this cumbersome, two-handed practice. To ease mounting an audio player 14 on apparatus 5, base 13 is provided with a mounting surface 40 that is coordinated with stem 10 and jack 11, each defining a distance relative to surface 40. These respective distances are determined so that, when audio player 14 is placed on surface 40, clip 16 and port 15 each define a distances relative to surface 40 comparable to the respective distances that stem 10 and jack 11 define relative to surface 40.

Figure 2B:
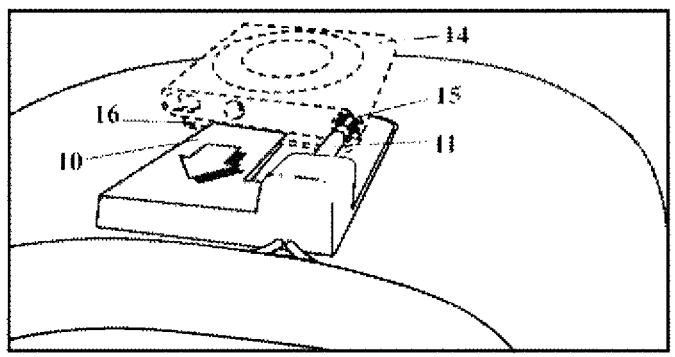

Referring to FIG. 2B, once stem 10 and clip 16 and jack 11 and port 15 are in registry, audio player 14 then slides along surface 40 to effect contemporaneous engagement of stem 10 and clip 16 and jack 11 and port 15. Bevel 30 of stem 10 is configured to wedge beneath ridge 18 and force clip 16 open, rather than abut ridge 18, which would prevent complete assembly of audio player 14 and apparatus 5. When stem 10 is received in clip 16, clip 16 squeezes stem 10 and maintains relative positioning therewith the resultant high coefficient of friction between ridge 18 and stem 10. Jack 11 and port 15, preferably are configured to promote snap fitting, as described above. Consequently, audio player 14 and apparatus 5 are securely assembled.

Figure 3C:
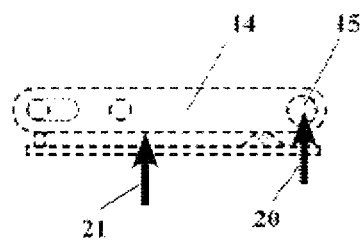

Comparing FIGS. 3B and 3C, bevel 30 and the alignment of stem 10 and jack 11 on base 13 permit mounting audio player 14 on apparatus 5 by bringing audio player 14 and apparatus 5 together along direction 20. Rather than the conventional way of securing or effecting physical connection of audio player 14 by attaching clip 16 to an object (not shown) along direction 19 as shown in FIG. 3B, bevel 30 allows for attaching clip 16 to the object (not shown) along direction 21 as shown in FIG. 3C, which is aligned with direction 20. Consequently, apparatus 5 affords the user the freedom to effect contemporaneous electrical and physical connection of audio player 14 in one direction with only one hand.

Figure 6A:
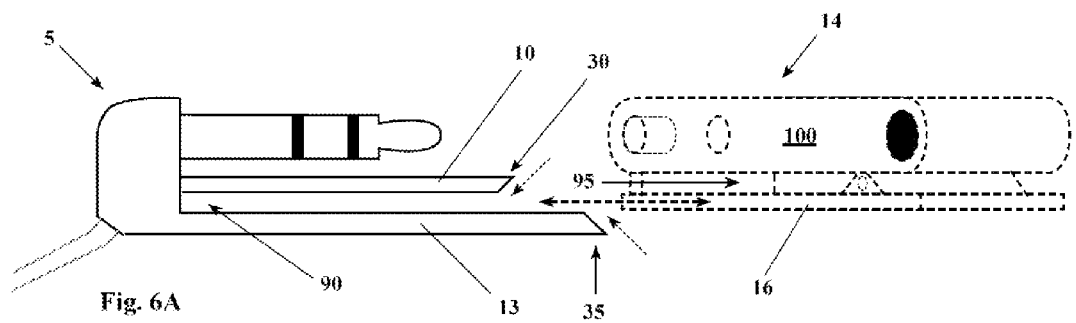
FIGS. 6A and B are environmental perspective views of the embodiment of FIGS. 1A and 1B respectively prior to and then receiving an audio player.
Figure 6B:
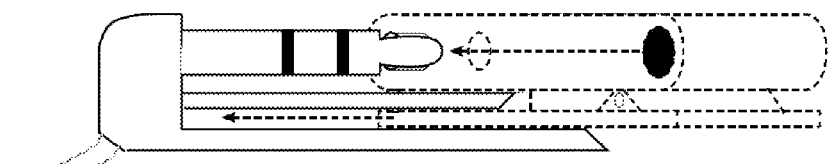

Referring to FIG. 6A, to promote assembly of audio player 14 with the invention, beveled edge 35 of base 13 is configured to urge the vertically-faced leading edge of clip 16 up and into a slot 90 defined by base 13 and stem 10, as shown in FIG. 6B. Edge 35 prevents clip 16 from abutting or jamming against base 13, which would prevent assembly of apparatus 5 and audio player 14.

Likewise, edge 30 of stem 10 is configured to urge the vertically-faced leading edge of clip 16 down into a slot 90, as shown in FIG. 6B. Edge 30 prevents clip 16 from abutting or jamming against stem 10, which would prevent assembly of apparatus 5 and audio player 14.

Figure 7A:
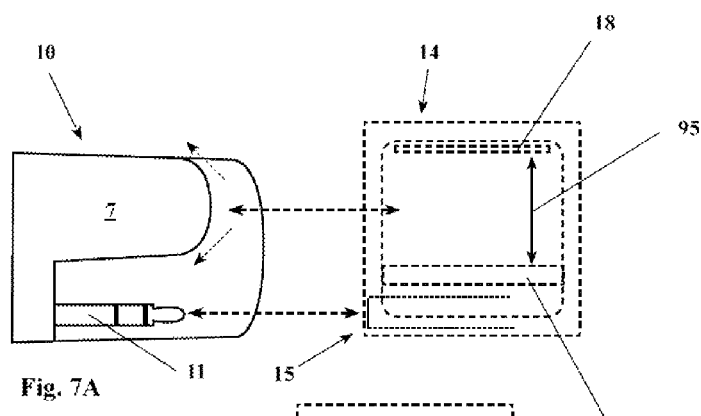
FIGS. 7A and 7B are environmental perspective views of the embodiment of FIGS. 1A and 1B respectively prior to and then receiving an audio player.
Figure 7B:
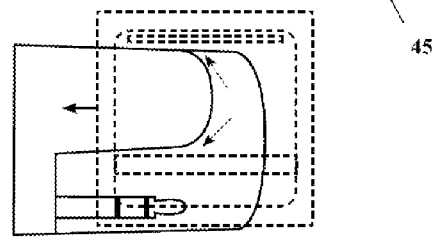

Referring also to FIG. 7A, profile 7 is configured to aid in snug assembly of audio player 14 with apparatus 5 and alignment of jack 11 with port 15. As may be appreciated from comparing FIGS. 6A and 7A, the slot 95, defined by clip 16 and the body 100 of audio player 14, is occluded. This renders insertion of an object of comparable width to that of slot 95 difficult. Profile 7, being relatively undersized distally, promotes ready reception in slot 95. As stem 10 is advanced through slot 95, the increasing width of stem 10 realized in slot 95 urges a desired alignment of stem 10 and slot 95, which promotes registry of jack 11 and port 15 and ultimate connection thereof.

Referring to FIG. 4, apparatus 5 may be mounted on a baseball cap 50. Preferably, as shown, the assembly 22 of audio player 14 and apparatus 5 is mounted under the bill 55 of cap 50, which shields audio player 14 from the elements and positions it within easy reach of the user.

Output 12 provides for connection with earphones 23 via thin stereo cables 24 positioned behind the liner of cap 50. Cables 24 branched from output 12 may wrap around either side of the user's head to a position 25 just behind the users ears, where they exit cap 50 at a convenient location for insertion into the user's ears. Cables 24 provide enough slack for a comfortable fit, yet not enough to catch on a standard collar or to flap around during physical activities such as running, biking, gardening, etc. Cables 24 may function as an integral antenna for radio-enabled audio players.

Figures 5A, 5B:
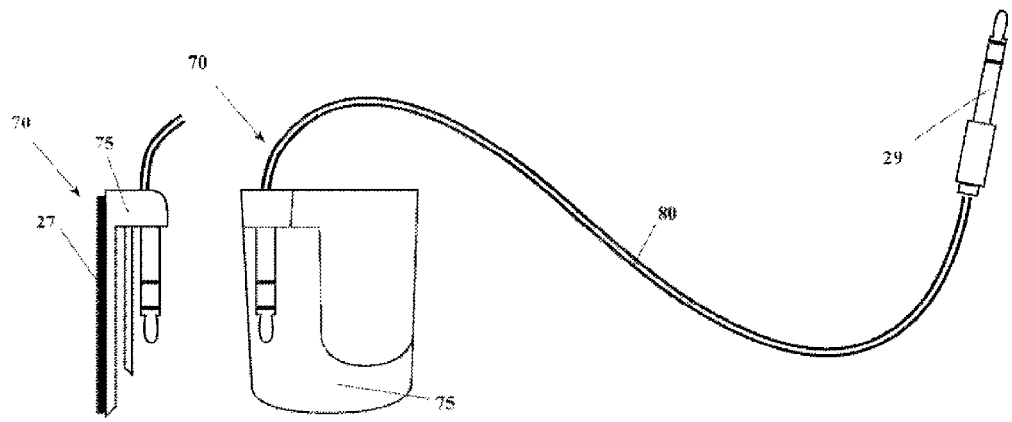
FIG. 5A is a right side elevational view of another embodiment configured according to principles of the invention.
FIG. 5B is a plan view of the embodiment of FIG. 5A.

Referring to FIGS. 5A and 5B, another embodiment 70 of the invention is similar to apparatus 5, but configured to connect an audio player (not shown) with an automobile sound system via a conventional auxiliary port 85 common to many automobiles. Double-sided, peel-and-stick adhesive backing 27 is affixed to a base 75. An audio cable 80 is electrically connected with jack 29. Alternative means for attaching base 75 to various surfaces are contemplated to be within the scope of the invention, such as, but not limited to hook and loop (VELCRO® brand), glue, conventional fasteners and the like.

Figure 5C:
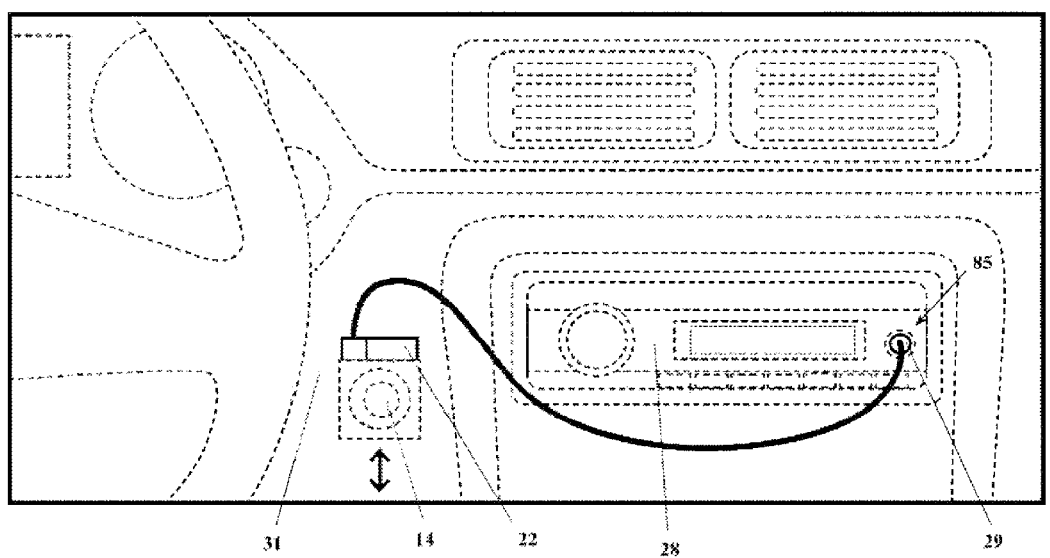
FIG. 5C is an environmental perspective view of the embodiment of FIGS. 5A and 5B mounted on a vehicle dashboard.

Referring to FIG. 5C, base 75 may be attached to the dashboard 31 of an automobile. The user removes the second peel-off covering on adhesive backing 27 and affixes same to dashboard 31 adjacent to the radio 28. Jack 29 is inserted into auxiliary port 85. Once the invention is affixed to the automobile and jack 80 is plugged into port 85, audio player 14 can be quickly mounted and/or detached with one hand in a single motion as described above with respect to apparatus 5.

The invention is not limited to the particular embodiments described and depicted herein, rather only to the following claims.

I claim:

1. Apparatus for mounting an audio player having an attached clip and a data port comprising:
    a base;
    a stem extending from said base and configured to be received in the clip; and
    a data jack extending from said base configured to be received in the data port;
    wherein said stem and said data jack are mutually exclusive and relatively aligned so as to promote engagement with the audio player along a direction.

2. Apparatus of claim 1, wherein said base, said stem and said data jack are configured so that, when the audio player is disposed on said base, said base positions the audio player relative to said stem and/or said data jack for engagement therewith.

3. Apparatus of claim 1, wherein said base is beveled.

4. Apparatus of claim 1, wherein said stem is tapered and/or beveled sufficiently to open the clip when urged therein.

5. Apparatus of claim 1, wherein said base and said stem are configured to urge reception of an object therebetween.

6. Apparatus of claim 1, further comprising a data port on said base configured to enable communication with said data jack.

7. Apparatus of claim 1, further comprising an electrical or auditory output operably connected with said data jack.

8. Apparatus of claim 1, wherein one or both of said stem and said data jack are configured to engage with the audio player, defining an engagement selected from: contact, interference fit, snap fit and combinations thereof.

9. Apparatus of claim 1, further comprising means for mounting said base to a surface.

10. Apparatus of claim 1, wherein said apparatus is mounted on or integral with a hat or an automobile.

11. Apparatus for mounting an audio player having an attached clip and a data port comprising:
    a stem configured to be received in the clip along a direction; and
    a coupler fixed relative to said stem and configured to engage data port;
    wherein said stem and said coupler are mutually exclusive and relatively aligned.

12. Apparatus of claim 11, further comprising means for effecting data communication with the audio player.

13. Apparatus of claim 11, wherein said coupler is configured to effect data communication with the audio player.

14. Apparatus of claim 11, wherein said coupler is configured to promote reception by the audio player.

15. Apparatus of claim 11, further comprising an electrical or auditory output operably connected with said coupler.

16. Apparatus of claim 11, further comprising means for mounting said apparatus to a surface.

17. Apparatus of claim 11, wherein said apparatus is mounted on or integral with a hat or an automobile.

* * * * *